United States Patent [19]
Lapré et al.

[11] Patent Number: 5,972,399
[45] Date of Patent: *Oct. 26, 1999

[54] COATED FOOD

[75] Inventors: John Arthur Lapré, Ede, Netherlands; William Thomas McNabola, Wilmington, Del.; Jan Veenstra, Barneveld, Netherlands; Hielke Tjeerd De Vries, Ede, Netherlands

[73] Assignee: Hercules Incorporated, Wilmington, Del.

[ * ] Notice: This patent is subject to a terminal disclaimer.

[21] Appl. No.: 09/018,493

[22] Filed: Feb. 4, 1998

Related U.S. Application Data

[62] Division of application No. 08/537,399, Oct. 2, 1995, Pat. No. 5,795,606.

[51] Int. Cl.⁶ ........................................... A23L 1/00
[52] U.S. Cl. ..................... 426/302; 426/89; 426/293; 426/305; 426/557; 426/575; 426/577
[58] Field of Search .................. 426/89, 293, 302, 426/305, 577, 575, 578, 557, 615

[56] References Cited

U.S. PATENT DOCUMENTS

| | | | |
|---|---|---|---|
| 2,517,595 | 8/1950 | Owens et al. | 99/166 |
| 2,611,708 | 9/1952 | Owens et al. | 99/166 |
| 2,703,286 | 3/1955 | Eppell | 99/166 |
| 3,395,024 | 7/1968 | Earle | 99/169 |
| 3,397,993 | 8/1968 | Strong | 99/100 |
| 3,865,962 | 2/1975 | Earle | 426/291 |
| 4,504,502 | 3/1985 | Earle et al. | 426/293 |
| 4,985,263 | 1/1991 | Klug et al. | 426/302 |
| 5,002,785 | 3/1991 | Lew | 426/303 |
| 5,360,614 | 11/1994 | Fox et al. | 424/439 |
| 5,545,410 | 8/1996 | Fox et al. | 424/439 |
| 5,795,606 | 8/1998 | Lapre et al. | 426/293 |

FOREIGN PATENT DOCUMENTS

| | | |
|---|---|---|
| 0487340A1 | 5/1992 | European Pat. Off. . |
| 1444303 | 5/1966 | France . |
| 01313421 | 12/1989 | Japan . |

*Primary Examiner*—Lien Tran
*Attorney, Agent, or Firm*—Martin F. Sloan

[57] ABSTRACT

A ready to eat, nonfried food made up of a cooked and hydrated carbohydrate core, and a cation crosslinked polysaccharide coating which substantially reduces the core's glycemic response.

32 Claims, 3 Drawing Sheets

COATED FOOD

This application is a division of application Ser. No. 08/537,399, filed Oct. 2, 1995 now U.S. Pat. No. 5,795,606.

FIELD OF THE INVENTION

The present invention relates to a ready to eat, nonfried food which includes a carbohydrate core, and a cation crosslinked polysaccharide coating which substantially reduces the core's glycemic response. The present invention further pertains to the method of preparing the food, and to a food preparation which is cooked to obtain the food. The present invention yet additionally pertains to use of the food for treating diabetes, hypoglycemia, and glycogen storage disease, and for suppressing appetite and assisting the performance of sustained physical activity.

BACKGROUND OF THE INVENTION

In the human digestive system, food is mechanically ground up and chemically broken down into small molecules that can be used by the body. Digestive enzymes from salivary, gastric, pancreatic, and intestinal glands hydrolyze proteins to amino acids, starch to simple sugars, and fats to glycerol and fatty acids. The digestive system consists essentially of the mouth, esophagus, stomach, small intestine and large intestine. The stomach acts as a reservoir which releases food slowly into the small intestine. Digestion is completed in the small intestine where the food is absorbed into the bloodstream or lymph vessels. The small intestine is around 5 meters in length and it normally takes food around 4–5 hours to pass through it before reaching the large intestine.

In the human diet, carbohydrates carry energy and supply carbon atoms to biosynthetic pathways. They are found in nature as structural elements in most types of cells and tissues. Based on the number of monomeric units which they contain, carbohydrates are classified as monosaccharides, disaccharides, oligosaccharides (chains of 3–10 monosaccharide units), or polysaccharides. Starch is one of the most common naturally occurring polysaccharides. The monomeric unit of starch is glucose. Other common polysaccharides are glycogen and cellulose. These are respectively the carbohydrate used to store energy by animals and the substance forming the skeleton of plant structures. The monomeric unit of both of these polysaccharides is also glucose.

Starch is present within plant cells as discrete microscopic granules enclosed in phospholipid membranes. The size and form of a granule is often characteristic of the plant of its origin. Within each granule, amylopectin forms a branched, helical, crystalline system with the linear amylose dispersed within the amylopectin structure. The digestibility of raw starch depends upon the accessibility and crystalline structure of its granules. The granules are gelatinized during cooking and freshly cooked starchy foods are easily digestible.

In western countries, starch constitutes about 60% of carbohydrates consumed. Starch is hydrolyzed in the intestinal tract into oligo-, di- and mono-saccharides. The enzymatic breakdown of polysaccharides, such as starch, into oligosaccharides actually starts in the saliva. However, the bulk of starch breakdown occurs in the small intestine. Here, enzymatic splitting takes place of poly- and oligosaccharides into low-molecular, and hence absorbable, monosaccharides such as glucose. Starch breakdown in the small intestine can be a quite rapid process so that the majority of the starch is broken down within one hour of entering the small intestine from the stomach.

The total starch (TS) content of a food is measured as the yield of glucose from a finely milled or homogenized sample of the food in which the starch is completely gelatinized at 100° C., treated with potassium hydroxide to ensure complete dispersion of the starches to an amorphous, digestible form and then enzymatically digested with pancreatin and amyloglucosidase.

Starches can be classified into a number of different types or fractions according to their behavior when incubated with enzymes without prior exposure to dispersing agents.

Three types of starch can be identified according to how they react to controlled periods of enzymatic digestion of homogenized and non-homogenized food samples. Firstly, rapidly digestible starch (RDS) consists mainly of amorphous and dispersed starch. It is typically found in high amounts in starchy foods which have been cooked by moist heat such as bread and potatoes. It is measured chemically as the starch which is converted to the constituent glucose molecules within 20 minutes of enzyme digestion. The next type is slowly digestible starch (SDS), which like RDS is in normal circumstances completely digested in the small intestine. However, its digestion proceeds more slowly than RDS. This fraction includes for example physically inaccessible amorphous starch. It is measured chemically as the starch converted to glucose after a further 100 minutes of enzyme digestion. The final starch type is resistant starch (RS) which may potentially resist digestion in the small intestine. It is measured chemically as the difference between TS obtained from the homogenized and chemically treated sample and the sum of RDS and SDS generated from non-homogenized food samples by enzyme digestion.

RS can be further subdivided into three sub-types. These are $RS_1$ which is starch resistant to digestion because it is in a physically inaccessible form such as partly milled grains and seeds; $RS_2$ which has a granular form which is particularly resistant to enzyme digestion; and $RS_3$ which is the starch fraction most resistant to digestion and which mainly consists of retrograded amylose formed during the cooling of gelatinized starch.

RS which is not digested in the small intestine passes through to the large intestine where it is fermented by colonic bacteria to produce short chain fatty acids, carbon dioxide and methane. It is evident that the speed at which a starchy food is digested will depend upon the relative proportion which it contains of RDS, SDS and the different RS sub-types.

The amounts and relative amounts of RDS, SDS and RS in foods are highly variable. They depend partly on the source of starch, but also on the type and extent of processing which the food is subjected to. It should be noted that, for most starchy foods, cooking converts starch to a readily digestible form. The Table below provides data for the in vitro digestibility of starch in a variety of foods. The values are obtained by carrying out assays in accordance with the techniques described above.

|  | % RDS | % SDS | $RS_1$ | $RS_2$ | $RS_3$ |
| --- | --- | --- | --- | --- | --- |
| Flour, white | 38 | 59 | — | 3 | t |
| Shortbread | 56 | 43 | — | — | t |
| Bread, white | 94 | 4 | — | — | 2 |
| Bread, wholemeal | 90 | 8 | — | — | 2 |
| Spaghetti, white | 55 | 36 | 8 | — | 1 |

-continued

|  | % RDS | % SDS | RS$_1$ | RS$_2$ | RS$_3$ |
|---|---|---|---|---|---|
| Biscuits, made with 50% raw banana flour | 34 | 27 | — | 38 | t |
| Biscuits, made with 50% raw potato flour | 36 | 29 | — | 35 | t |
| Peas, chick, canned | 56 | 24 | 5 | — | 14 |
| Beans, dried, freshly cooked | 37 | 45 | 11 | t | 6 |
| Bean, red kidney, canned | 60 | 25 | — | — | 15 |

In the above Table, values are expressed as a percentage of the total starch present in the food. The index "t" represents that only a trace of the particular starch type could be detected. It is evident from the data set out in the above Table that different foods have quite different relative contents of the different starch types.

When starch is digested in the small intestine it causes the level of glucose present in the blood to rise. The level of blood glucose in a healthy individual usually lies in the range 75–125 mg/100 ml. A greater glucose level can lead to heart, circulation, eye and kidney problems. A lower glucose level can lead to fatigue, fainting and hypoglycemic shock.

The highest point of the blood glucose level engendered by the indicated digestion of a food is known as the "glycemic response" of the food. The precise glycemic response of a food will vary according to the amount of food eaten and from individual to individual, depending upon such factors as the properties of the food, the efficiency of the individuals' digestive systems, and whether they suffer from diabetes.

With respect to digestion and health, it is important—as previously noted—for the blood glucose level of an individual to be controlled within a certain range. The two factors of greatest importance to enable this control are the activity of the liver and the balance of hormones. The liver has a certain autonomy. It is presently understood to have sensors which monitor blood glucose level. When the level is high, the liver removes glucose from the blood; when the level is low, it releases glucose into the blood.

In the hormonal regulation of blood glucose, the balance between insulin and glucagon is of prime importance. These two hormones are secreted by the pancreas in varying ratios, depending primarily upon the prevailing concentration of blood glucose. Any increase in the blood glucose level stimulates increased secretion of insulin, whereas a decrease in the blood glucose level stimulates the secretion of glucagon.

Some individuals are unable to control their blood glucose level by their own naturally produced insulin. This leads to the disease of diabetes. This disease is characterized by an above normal concentration of glucose in the blood. Diabetes is presently the third leading cause of death in the United States, where it kills 300,000 people per year. In 1950, there were 1.2 million diabetics in the United States, in 1975 there were 5 million diabetics and in 1991 there were more than 11 million diabetics. Accordingly, it is increasingly important to provide effective palliatives for the disease.

There are two types of diabetes which have different underlying causes. In Type 1 or insulin-dependent diabetes, there is an absolute deficiency of insulin and the patient may require regular injections of insulin to maintain glycemic control. In addition to insulin, diet and exercise must be carefully regulated in order to maintain good blood-sugar control.

In contrast, in Type 2 or non-insulin dependent diabetes, the pancreas is producing insulin, although it may not be doing so at normal levels. Although insulin is present, blood glucose levels are still abnormal because the body does not respond to it. However, the cause of this insulin resistance is presently unknown. Of people who are diagnosed as having this form of diabetes, 80% are overweight. Some non-insulin dependent diabetics can control their condition through diet and exercise alone. Other diabetics may need a combination of diet, exercise and medications. Medications for this type of diabetes include a class of drugs called oral hypoglycemic agents that help non-insulin dependent diabetics use blood glucose better.

A related disease, hypoglycemia, is caused by excessive circulating insulin. This is normally a result of an accidental overdose of insulin by a diabetic. This excess insulin results in a lowering of the blood glucose level. This particularly affects the brain which utilizes glucose as its main source of energy. Mild hypoglycemia can result in a lack of coordination. If the insulin excess is great enough, convulsions may occur, followed by coma.

With regard to the characteristics of the food itself, carbohydrates are an important part of a diabetic's diet. It is evident that diabetics should usually avoid foods having a high glycemic response, i.e., those which result in a relatively high level of blood glucose soon after digestion. Instead, diabetics require foods having a relatively low glycemic response which produce a slower rate of glucose release into the blood. Slowing the rate of release of glucose into the blood reduces the risk of both hyperglycemia and hypoglycemia.

This slowing of the glucose release rate can be achieved by reducing the rate of digestion of the food. Thus, if the speed of digestion can be lowered, the initial rush of glucose from RDS can be prevented and instead replaced by a controlled and lengthier digestive process along the whole length of the small intestine leading to slow release of glucose into the blood stream. Foods which only slowly release glucose into the blood stream may also be advantageous in suppressing the appetite of an individual, and for assisting an individual to perform sustained physical activity. In the former case, the presence of an above normal level of glucose in an individual's bloodstream may cause a feeling of satiety and so discourages snacking. In the latter case, the continual release of glucose into the bloodstream assists an individual to perform strenuous exercise as the glucose acts as a readily accessible form of fuel to working muscles.

Particularly as to the effect of a food's properties upon the glucose release rate, there are a number of basic principles concerning the glycemic response of a food. For instance, a food which includes a substantial content of RDS will possess a higher glycemic response, weight for weight, than a food formed substantially from SDS. In turn, such SDS-containing foods will give rise to a greater glycemic response than foods formed mostly from RS. In general, slowly digested foods produce flatter glycemic responses. Such foods have been termed "lente carbohydrate foods."

Several other characteristics of a food can affect its glycemic response. These include its particle size and texture, and any disruption which has taken place of its cell wall structure. Thus, cooked rice grains give rise to a smaller glycemic response than cooked flour. Cracking or milling of cereal grains to produce progressively greater disruption and finer particle sizes result in increased glycemic response values. Foods of coarse consistency possess smaller glycemic response values when swallowed without chewing, reinforcing the importance of particle size.

Further with respect to effecting modifications in foods' physical properties, the encasing of foods in different coatings is known. However, the various embodiments as taught in the art are characterized by disadvantages.

For instance, U.S. Pat. Nos. 2,517,595 and 2,611,708 disclose food articles encased in calcium-alkali and calcium pectinate and pectate films. Both identify rice as one of the foods that can be thusly coated.

These references indicate that the coating offers resistance against dirt and bacteria. They also state that food products provided with the coating can be eaten with the coating left on. Yet further, both references teach that if the coated food is cooked before eating, such as by boiling in water, then the film will dissolve in the cooking water and thereby be entirely removed.

U.S. Pat. No. 2,611,708 still additionally indicates, in this regard, that the indicated dissolution and entire removal is effected where the calcium content of the film is low. This patent in particular teaches that the food article is first coated with pectinate or pectate; then contacting with a calcium salt solution is effected while this coating is wet, to convert the alkali pectinate or pectate into a calcium-alkali or calcium pectinate or pectate. It further teaches that if the replacement of alkali ions is virtually complete, the resulting calcium pectinate or pectate films are stronger and more suited for the coating of foods which are to be cooked; in such instance, the film is softened during cooking, and can be easily stripped off the food article—if desired, by immersing the coated food article in hot water containing a small amount of a calcium sequestering agent.

These references do not disclose or suggest a food product including both a cooked and hydrated carbohydrate core, and a cation-crosslinked polysaccharide coating to substantially reduce the core's glycemic response; glycemic response is not mentioned. These references also do not disclose or suggest a food product with a carbohydrate core and such a glycemic response-reducing, cation-crosslinked polysaccharide coating which is disclosed to be insoluble in boiling water.

Yet further, cooking is discussed only in the context of occurring after crosslinking of the polysaccharide. There is no teaching or suggestion of effecting the crosslinking during cooking in an aqueous medium, or of a product obtained by such means.

U.S. Pat. No. 2,703,286 discloses the coating of foodstuffs with a combination of low methoxyl pectinate modified by a calcium salt, and methyl cellulose. A calcium chloride solution is applied to the foodstuff before and/or after application of the methyl cellulose and pectinate coating composition; if completely demethoxylated sodium pectinate is employed, the methyl cellulose is not required. Foodstuffs disclosed as being suitable include fruit bars, candy bars, cereal bars prepared by compressing mixtures of ingredients including cooked flour, and dried meat bars.

Here also, there is no disclosure or suggestion of a food product including both a cooked and hydrated carbohydrate core, and a cation-crosslinked polysaccharide coating which substantially reduces the core's glycemic response; once again, glycemic response is not mentioned. Further, there is no disclosure or suggestion of a food product with a carbohydrate core and such a glycemic response-reducing, cation-crosslinked polysaccharide coating which is insoluble in boiling water.

Yet additionally, in this reference cooking is discussed only in the context of prior treatment for starting materials, with the application of the pectinate coating and the crosslinking being subsequently effected. As with U.S. Pat. Nos. 2,517,595 and 2,611,708, there is no teaching or suggestion of effecting the crosslinking during cooking in an aqueous medium, or of a product obtained by such means.

U.S. Pat. No. 5,360,614 discloses encapsulating metabolizable carbohydrate in a time delay release layer, to provide a controlled release upon ingestion, and modulate the blood glucose response. This delayed release action is indicated to be helpful in counteracting the effects of diabetes; further administration of thusly coated carbohydrates is stated to be useful in conjunction with exercise programs calling for sustained effort. Among the coatings disclosed in this reference is ethyl cellulose. Controlled release of carbohydrates from pre-gelatinized starch granules obtained from cereals, such as rice, is also disclosed.

In this reference, there is no teaching or suggestion of crosslinking the coating at all.

European Application No. 487,340 discloses fried food compositions, encased in cation crosslinked polysaccharide coatings to impede the penetration of oil during the frying process; the products thusly coated and fried have a low concentration of the oil. Particularly, Example 31 teaches the soaking of potato strips in an aqueous solution of low molecular weight pectin and calcium for 6 minutes at 85° C., with the thusly treated strips being subsequently fried in oil.

With regard to the present invention, this reference does not disclose or suggest a crosslinked polysaccharide-coated food which is ready to eat in the nonfried condition; rather, the food requires frying before consumption. The unfavorable properties which characterize fried foods are well known in the art; this point is of course recognized in European Application No. 487,340 itself, with the very purpose of the invention set forth therein being to reduce the disadvantageous effects of frying. In any event, fried foods are further known as being particularly unsuitable for individuals attempting to minimize their caloric intake, or who are afflicted with conditions affecting the body's ability to maintain a proper blood glucose level—e.g., diabetes and hypoglycemia, as discussed herein.

SUMMARY OF THE INVENTION

The present invention pertains to a ready to eat, nonfried food which comprises both a core and a coating which substantially reduces the core's glycemic response; the core comprises a carbohydrate, and the coating comprises a cation crosslinked polysaccharide. In a preferred embodiment, the core is cooked and hydrated; also as a matter of preference, the coating is at least substantially insoluble in boiling water.

The invention further pertains to a food preparation for cooking in an aqueous medium. The food preparation comprises a coated core; the coated core comprises (1) a core which itself comprises a carbohydrate, and (2) a coating which comprises a crosslinkable polysaccharide. The food preparation further comprises a source of cations for dissolution in the aqueous medium, and for crosslinking the polysaccharide during cooking of the food preparation.

The invention further pertains to a method of preparing a food, comprising heating the indicated coated core in an aqueous medium comprising crosslinking cations. The heating is effected to crosslink the crosslinkable polysaccharide, and to cook and to hydrate the core.

The invention further pertains to the use of a cation crosslinked polysaccharide coating for substantially reducing the glycemic response of a carbohydrate containing food. This use can have nontherapeutic effects—such as suppressing appetite, and assisting an individual to perform sustained physical activity.

This use can also have therapeutic effect for individuals suffering from diabetes, hypoglycemia, or glycogen storage disease. Specifically, foods thusly coated are useful for people suffering from these diseases, because the foods do not cause an initial surge in the level of blood glucose after being eaten; instead, they give rise to a slower rate of glucose release spread over an extended period of time.

Correspondingly, the invention further pertains to a method of treating diabetes, hypoglycemia, or glycogen storage disease in an individual, and to a method of suppressing the appetite or of assisting the performance of sustained physical activity of an individual. These methods comprising administering to the individual a ready to eat, nonfried food as discussed herein, which slows the rate of glucose release—from digestion of this food—into the individual's blood.

DETAILED DESCRIPTION OF THE INVENTION

Figure 1:
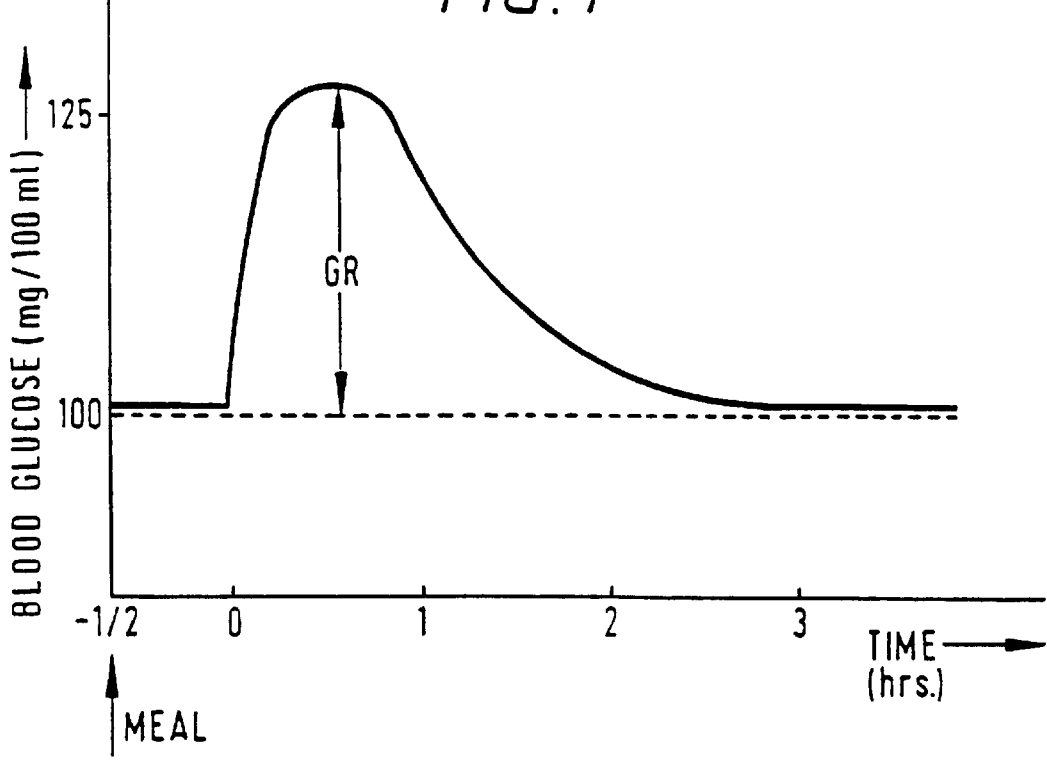
FIG. 1 is a hypothetical illustration showing the glycemic response of an individual to normal (uncoated) food.

The term "food", as used herein, refers to any material which is edible or can be rendered edible by any form of processing such as cooking. The term "food" therefore encompasses food ingredients such as a flour granule or granules, a starch granule or granules, and raw vegetables; it also encompasses food products and food preparations, as discussed herein.

The term "food product", as used herein, refers to a food in an edible form ready for eating, such as cooked rice. A food product is accordingly understood as being a ready to eat food.

The term "food preparation", as used herein, refers to a plurality of ingredients to be combined, and possibly also cooked, in order to obtain a food product.

The "glycemic response" of a food, as discussed herein, refers to the highest blood glucose level resulting from digestion of the food.

The crosslinkable polysaccharides suitable for the coating of the invention include alginate, alginic acid, pectin, pectinic acid, pectinate, pectate, polygalacturonic acid, carrageenan, crosslinkable cellulose and derivatives thereof, xanthan gum, agar, crosslinkable starch and crosslinkable guar gum; of these, alginate, alginic acid, pectin, pectinic acid, pectinate, and pectate are particularly preferred. One or more polysaccharides may be used.

The crosslinkable polysaccharides may be crosslinked by one or more suitable cations; calcium and magnesium cations, alone or in combination, are preferred. The crosslinking cations can be provided by any suitable source, such as edible salts. Appropriate edible salts include calcium chloride, calcium sulphate, magnesium chloride and magnesium sulphate.

The crosslinked polysaccharide coating of the invention preferably at least essentially insoluble, or at least substantially insoluble, in boiling water. As a matter of particular preference, the coating is insoluble in boiling water.

The coating preferably extends over at least about 50% of the surface area of the core. It is apparent that in areas where the food is uncoated, then digestion in the small intestine of this part of the food can proceed at the normal pace. In this case, the effect of coating the remaining surface area of the food is diminished. Therefore, as a matter of particular preference, the coating covers at least essentially all, or at least substantially all, of the surface area of the core. It is most preferred that the cross-linked polysaccharide coating cover all of the surface area of the core—surrounding the core so as to encase it fully.

The polysaccharide coating around the core is preferably relatively thin, so that the weight of the coating makes up only a small fraction of the coated food product. Accordingly, the cation cross-linked polysaccharide coating preferably comprises about 0.01–5% by weight (on a dry weight basis)—more preferably about 0.1–4%, and most preferably about 1–3%—of the coated core in its entirety.

Carbohydrates suitable for the core of the invention include peptidoglycan, polysaccharide, oligosaccharide, disaccharide, monosaccharide and sugar alcohol. In particular, the carbohydrate may be starch, dextrin, sucrose, mannose, maltose, glucose, fructose, lactitol, xylitol, sorbitol, lactose and mannitol. Most preferably, the carbohydrate includes at least starch. One or more carbohydrates may be employed.

The carbohydrate-containing foods are suitable for the core of the invention. Appropriate foods include, for example, rice grains, pasta shapes such as tubes, spirals and shells, and vegetables and parts thereof. Such parts of a vegetable include cubes, dies, slices or chips. The core may also be a piece of breakfast cereal such as corn flakes, puffed rice or shredded wheat.

Yet further, the core may be a food ingredient for combining with other ingredients—e.g., the core may be a flour granule or granules, or a starch granule or granules. Such food ingredients—i.e., suitable for employment as the core of the invention—include those incorporated into puddings, candy bars, and food bars, and into instant foods such as soups and dessert mixes.

It is understood that if the coated core is relatively large, then it will be chewed in the mouth. This will reduce the effectiveness of the coating because parts of the coating may be stripped away, with uncoated parts from the core becoming exposed by the chewing action.

This tendency of a food to be chewed is reduced if the food is relatively moist on its surface, e.g. boiled vegetable cubes and slices. This is because such moist food is relatively easy to swallow and requires little chewing.

The susceptibility of a food to chewing also depends upon its size. The smaller the pieces of food are, the lower the tendency is to chew them.

Therefore, the core of the invention preferably has a cross sectional area, measured along its width or shortest dimension, of not more than about 1 cm², and more preferably not more than about 0.1 cm². Additionally or in the alternative, the core of the invention preferably has a length, or longest dimension, of not more than about 3 cm, and preferably of not more than about 1 cm. As a matter of particular preference, the core also has an elongate shape.

In this regard, the core may have an extended length, but with a relatively small cross-section. Foods with this configuration have relatively little of their interior exposed when chewed. Particularly, the core may have an elongate shape—with the indicated cross sectional area of not more than about 1 cm², and more preferably not more than about 0.1 cm²—and further with the extended length, as discussed. Spaghetti is a therefore suitable as the core of the invention.

Alternatively, the core may be limited in both length and width. In a preferred embodiment, the core may have an elongate shape, with a cross sectional area of not more than about 1 cm² and preferably not more than about 0.1 cm², and also with a length of not more than about 3 cm, and preferably of not more than about 1 cm. Grains of rice are therefore suitable—these tending not to be chewed to any significant extent, so that very little of the interior of the rice grains becomes exposed during chewing.

The foods of the invention include ready to eat, nonfried foods. Correspondingly, the foods of the invention include food ingredients—such as a flour granule or granules or a starch granule or granules—that can be used in combination with other food ingredients to prepare a food product. In this case, the food product may comprise at least 10%, preferably at least 25%, more preferably at least 50% and most preferably at least 75% by weight of one or more coated cores of the invention.

As discussed herein, the food preparation of the invention comprises:
 (i) a carbohydrate core as discussed herein, coated with a crosslinkable polysaccharide coating; and
 (ii) a source of the cations for crosslinking the polysaccharide, also as discussed, the components (i) and (ii) being separate or in physical admixture.

In the food preparation of the invention, the amount of crosslinking cations should preferably be about 0.01–20%—more preferably about 0.05–15%, still more preferably about 0.1–5%, and as a matter of particular preference about 0.3%—by weight, based on the amount of the crosslinkable polysaccharide initially coated on the core. In a preferred embodiment, the core is a grain of parboiled rice.

From this food preparation, a food product—preferably, a nonfried, ready to eat food of the invention—can be prepared by means of a one-step cooking procedure. Further, the food preparation can be marketed in this one-step form.

Specifically, components (i) and (ii) can simply be mixed together in water and cooked—for example, by boiling or simmering. The mixing of the components causes the crosslinking cations to crosslink with the crosslinkable polysaccharide, thus forming a cation crosslinked polysaccharide coating around the food cores. As discussed herein, because the polysaccharide coating does not become fully crosslinked until after the food cores have been hydrated, the resulting cation crosslinked polysaccharide coating is resistant to boiling water. Thus, whilst the food core is hydrating in the water, the crosslinkable polysaccharide surrounding the core is sufficiently elastic so that it does not peel away as the core swells due to hydration.

Consistent with the foregoing, a further aspect of the invention is a method of preparing a food—here also, preferably a nonfried food product of the invention. In this method, a carbohydrate core coated with crosslinkable polysaccharide is heated—particularly, cooked—in an aqueous solution of crosslinking cations. The core is thusly hydrated, while simultaneously the coating is crosslinked.

This cooking step is conducted at a temperature and for a period of time necessary to provide the requisite cooking of the core and crosslinking of the polysaccharide. The identity and size of the core, the identity of the polysaccharide, the thickness of the coating, and the properties desired for the final food product are factors which can affect these temperature and time parameters. Appropriate temperatures and times for this step can readily be determined by those of ordinary skill in the art, without undue experimentation.

As a prior step in the method of the invention—i.e., before the indicated heating in the aqueous cation solution—the crosslinkable polysaccharide can be coated on the food core by spraying or dipping the food core with or in an aqueous solution of the polysaccharide. The crosslinkable polysaccharide preferably comprises about 0.01–10%—more preferably about 0.1–5%—by weight of the aqueous solution employed in this coating step.

Also as a matter of preference, for the coating step the temperature of this solution is at or above the dissolution temperature of the polysaccharide. As a matter of particular preference, coating is conducted with this solution at a temperature of about 40–100° C.

The identity and size of the core, the identity of the polysaccharide, the thickness of the coating which is intended, and the properties desired for the final food product are factors which can affect these temperature and time parameters for this coating step. Here also, appropriate temperatures and times can readily be determined by those of ordinary skill in the art, without undue experimentation.

Following the indicated coating step, the thusly obtained coated core is preferably dried prior to the step of heating or cooking the food core in the presence of the crosslinking cations. Particularly where the food core is a rice grain, the result of drying the rice grain coated with the crosslinkable polysaccharide is to produce so-called parboiled rice.

In a particularly preferred embodiment, the ready to eat, nonfried food of the invention comprises a thusly coated, hydrated and cooked grain of rice or pasta shape. Such a coated food can be prepared, for example, by boiling rice in an aqueous solution including 2% by weight of pectin or alginate, for around 10–20 minutes. The boiled rice is then dried to form parboiled rice, as indicated. The parboiled rice is cooked for 2–10 minutes, in an aqueous solution of about 0.5–3% by weight of any suitable calcium salt—for instance, calcium chloride.

The food obtained from this procedure comprises a core of a hydrated rice grain, and a coating layer comprising the calcium crosslinked polysaccharide—i.e., pectin or algininate, depending upon which was used. Because the cation crosslinked polysaccharide coating is formed whilst the rice is cooking, the rice grains have an opportunity to hydrate and swell before the crosslinked coating becomes full formed. Whilst crosslinking of the polysaccharide is taking place, the polysaccharide is somewhat elastic, and so can stretch to some extent as the rice grains swell due to their hydration. Accordingly, the cation crosslinked polysaccharide coating surrounding the rice grain is not removed by boiling water.

The foregoing method can be contrasted with forming a cation crosslinked polysaccharide around an uncooked rice grain. On cooking in boiling water, such a rice grain swells as it becomes hydrated, causing the coating layer to peel away and so apparently to be dissolved—in the manner as described in U.S. Pat. Nos. 2,517,595 and 2,611,708, as discussed herein.

As to the nonfried, ready to eat food of the invention, the presence of the coating reduces the rate of digestion of the carbohydrate in the small intestine. In conventional foods of the prior art, there is a relatively rapid release of glucose into the bloodstream following digestion of all of the RDS and some of the SDS. In contrast, coating the food with the cation crosslinked polysaccharide coating, according to the present invention, substantially prevents any digestion from occurring in the stomach, and then slows down the rate of digestion of the food as it passes through the small intestine so that the rate at which glucose is released into the bloodstream is reduced. This in turn results in the coated food giving rise to a lower glycemic response.

Indeed, herein the glycemic response of a food is discussed as an absolute value—i.e., in terms of the blood glucose level resulting from digestion of the food. However, apart from the consideration of absolute value, a significant feature with respect to the invention is the amount of difference in glycemic response between the uncoated core and the coated core of the invention.

Figure 2:
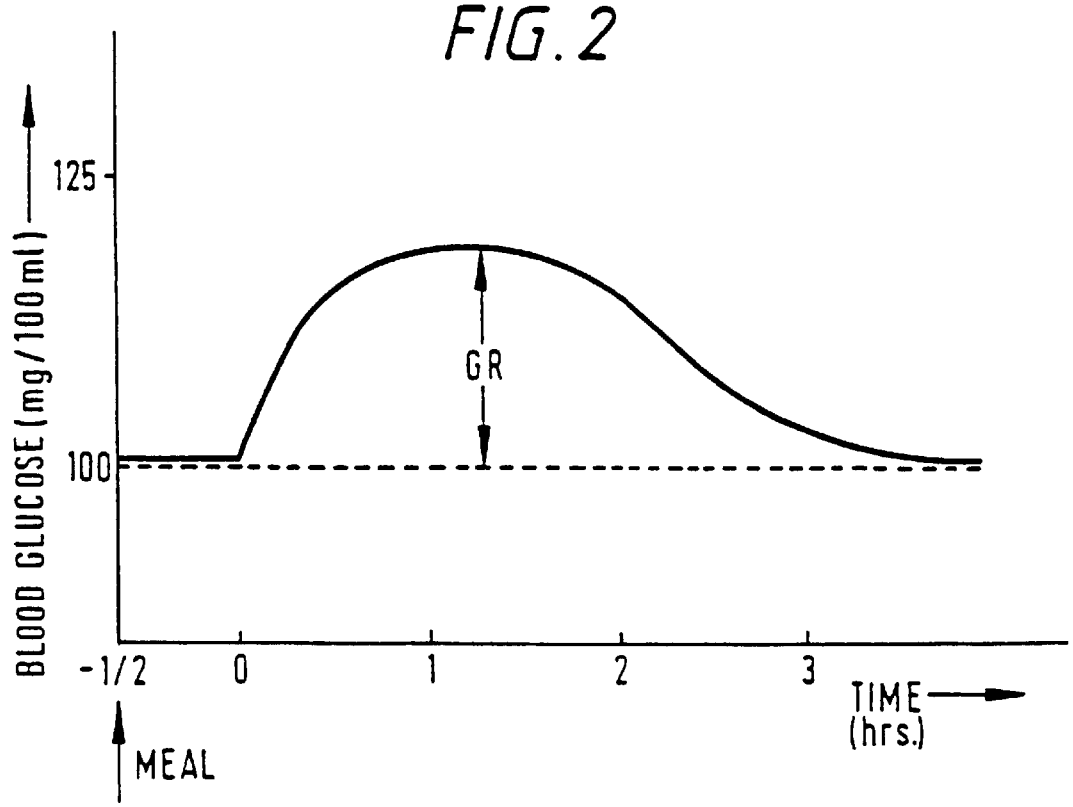
FIG. 2 is a hypothetical illustration showing the glycemic response of an individual to coated food in accordance with the present invention.

In this regard, the lower glycemic response which characterizes the present invention is illustrated in FIGS. 1 and 2.

FIG. 1 depicts the change in blood glucose level occurring when a carbohydrate-containing meal is consumed. The height of the curve, labelled GR, depicts the glycemic response of the food. As is shown, there is a characteristic rise then fall in the blood glucose level over a period of about 3 hours.

The blood glucose level does not rise immediately because the food must first pass through the stomach before entering the small intestine. This takes around 0.5–1 hours. Once the food enters the small intestine from the stomach, then the blood glucose rises from its fasting level of about 100 mg/100 ml. This is caused by the digestion of polysaccharides such as starch into glucose, and then the entry of this from the gut and liver into the peripheral blood circulation. The subsequent fall to fasting levels is due to the action of insulin, secreted by the pancreas in response to various meal-related stimuli including glucose. Insulin causes the blood glucose level to fall by increasing the membrane transport, utilization, and storage of glucose from the blood in insulin-sensitive cells. Insulin acts at specialized transporter sites that exist for glucose within the plasma membrane of many cell types, notably in muscle and fat cells.

The effect of the invention is illustrated in FIG. 2, which shows the change in blood glucose level which would occur where the same carbohydrate-containing meal is eaten at time (t)=-1/2 as in FIG. 1, except that the food has been coated with a cation crosslinked polysaccharide. This coating would prevent the initial surge in blood glucose found for uncoated food. Instead, it would retard the food's digestion, resulting in glucose being released into the bloodstream at a slower rate and over a longer period of time.

Thus, the areas under the curves in FIGS. 1 and 2 will be substantially equal. The cation crosslinked polysaccharide coating provided around a food according to the present invention can be viewed as converting the RDS and SDS of the food to a $RS_1$ type. It will be recalled that $RS_1$ is resistant to digestion because it is in a physically inaccessible form. In effect, the function of the polysaccharide coating is to prevent the digestive system of the small intestine from rapidly digesting SDS and RDS present in the carbohydrate-containing food because these are rendered inaccessible by the coating.

With respect to the foregoing, the ready to eat, nonfried food of the invention, by virtue of its cation crosslinked polysaccharide coating, in fact has a substantially lower glycemic response than would be obtained from the food if the coating were absent. Specifically, this coating does indeed substantially reduce the glycemic response of the food.

Preferably, the coating of the invention reduces this glycemic response by at least about 10%, more preferably by at least about 15%, and still more preferably by at least about 20%. As a matter of particular preference, this coating reduces the glycemic response of the food by at least about 30%.

The reduction in glycemic response can be quantified in terms of reduction of the degree of starch digestion—which in turn is determined from a modified version of the in vitro assay method for measuring RDS, SDS, and RS fractions, as set forth in ENGLYST et al., "Classification and Measurement of Nutritionally Important Starch Fractions", *European Journal of Clinical Nutrition*, 1992, Vol. 46 (Suppl. 2), at pages S33–S50. ENGLYST et al is incorporated herein in its entirety, by reference thereto.

The particular assay method referred to herein is that which is set forth at pages S38 and S39 of ENGLYST et al., under the heading "Measurement of RDS, SDS, and RS fractions".

In this assay method, the first procedure after sample preparation—this first procedure being set forth under the subheading "Measurement of RDS and SDS"—is for the purpose of mimicking natural digestion, and effects breakdown of starch in the sample being assayed; what occurs in this procedure is accordingly referred to herein as in vitro digestion. The free glucose (FG) present in a sample after this in vitro digestion includes the glucose liberated by the starch breakdown.

The second procedure after sample preparation—this second procedure being set forth under the subheading "Measurement of TG"—is conducted with the sample after it has been subjected to the first procedure. This second procedure determines the total glucose (TG) in the sample—including both the previously discussed glucose liberated by the in vitro digestion, and also the glucose which remained polymerically bound after the first procedure.

The differences between the modified assay method as discussed herein, and the indicated ENGLYST et al. assay method, reside in the "Measurement of RDS and SDS" first procedure. These differences are as follows:

whereas ENGLYST et al. specifies taking the first sample (RDS fraction) after 20 minutes and a second sample (SDS fraction) after 120 minutes, in the modified assay method samples are taken after 5, 10, 15, 20, 30, 60, 90, 120, and 180 minutes;

whereas ENGLYST et al. specifies pipetting the samples in 20 ml 66% ethanol, in the modified assay method the samples are pipetted in 1.0 ml 96% ethanol;

in the modified assay method, further dilution is employed after centrifugation—i.e., 50 μl of the clear supernatant in 1000 μl demineralized water—thusly providing a dilution factor of 63 for the modified assay method, in contrast with the dilution factor of 41 for the original ENGLYST et al. assay method; and in employment of the glucose oxidase colorimetric kit for measuring glucose, a standard curve is employed for the modified assay method, whereas only one standard is used in the original ENGLYST et al. assay method.

The degree of in vitro starch digestion obtained for a particular sample is a function of that sample's FG and TG values—specifically, a comparison between FG and TG. This parameter can accordingly be expressed as FG/TG.

Preferably, as determined from the thusly modified ENGLYST et al. assay method, the ready to eat, nonfried food of the invention is characterized by a degree of in vitro starch digestion which—in comparison with the degree of in vitro starch digestion obtained with an uncoated but otherwise identical sample of the food—is reduced by at least about 15%, 30 minutes after initiation of the digestion. Accordingly, after 30 minutes of in vitro digestion, the amount of FG liberated from the coated food is preferably at least about 15% less than that liberated from the uncoated food.

It is further preferred that the indicated reduction in degree of in vitro starch digestion be at least about 15% after 60 minutes of the digestion. After both the 30 minute and the 60 minute periods, this reduction in degree of in vitro starch digestion should more preferably be at least about 20%—and still more preferably at least about 25%, and still more preferably at least about 30%, and still more preferably at least about 35%, and still more preferably at least about 40%, and still more preferably at least about 60%.

As used herein, the term "substantially" includes instances where either the degree of in vitro starch digestion, as determined from the modified ENGLYST et al. assay method, is "substantial", or the reduction in glycemic response is substantial, also as discussed herein.

As measured according to the indicated ENGLYST et al. assay method, it is yet additionally preferred that after one hour of in vitro digestion, no more than about 80% of the carbohydrate present in the ready to eat, nonfried food of the invention be released. More preferably, no more than about 60%, and most preferably no more than 50%, of the carbohydrate should be released.

The percentage of the carbohydrate which is thusly released varies according to the thickness of the coating. Thus, the thicker the coating of the cation crosslinked polysaccharide, then the slower the rate of glucose release from the food into the assay system.

The present invention accordingly has many advantages over previously available foods. For instance, the crosslinked polysaccharide coating material such as alginate, alginic acid, pectin, pectinic acid, a pectinate or a pectate can easily be coated on the food by using standard cooking procedures such as boiling or simmering in water. Thus, the use of fats as the coating, and the need to use a nonaqueous organic solvent to apply the food coating, are both avoided.

Particularly, the practical advantages of the present invention are many fold. In this regard, the invention provides a food-based strategy to control the release of glucose from carbohydrate-containing foods. The coated foods of the invention have no marked difference in their palatability or taste from uncoated foods. The same foods can therefore be eaten both by individuals suffering from e.g. diabetes and by those who do not.

With regard to those suffering from diabetes, the foods allow them improved control over their blood glucose levels. It is believed that in healthy individuals, the foods also provide a feeling of prolonged satiety, and so accordingly may help to prevent snacking between meals; the foods therefore have a possible function as appetite suppressants. Further, because the coated foods take longer to digest in the small intestine, they give rise to prolonged release of glucose into the blood stream compared to normal foods. Such coated foods can therefore assist the performance of an individual during prolonged physical exercise during which glucose is constantly required by the muscles as an energy source.

Figure 3:
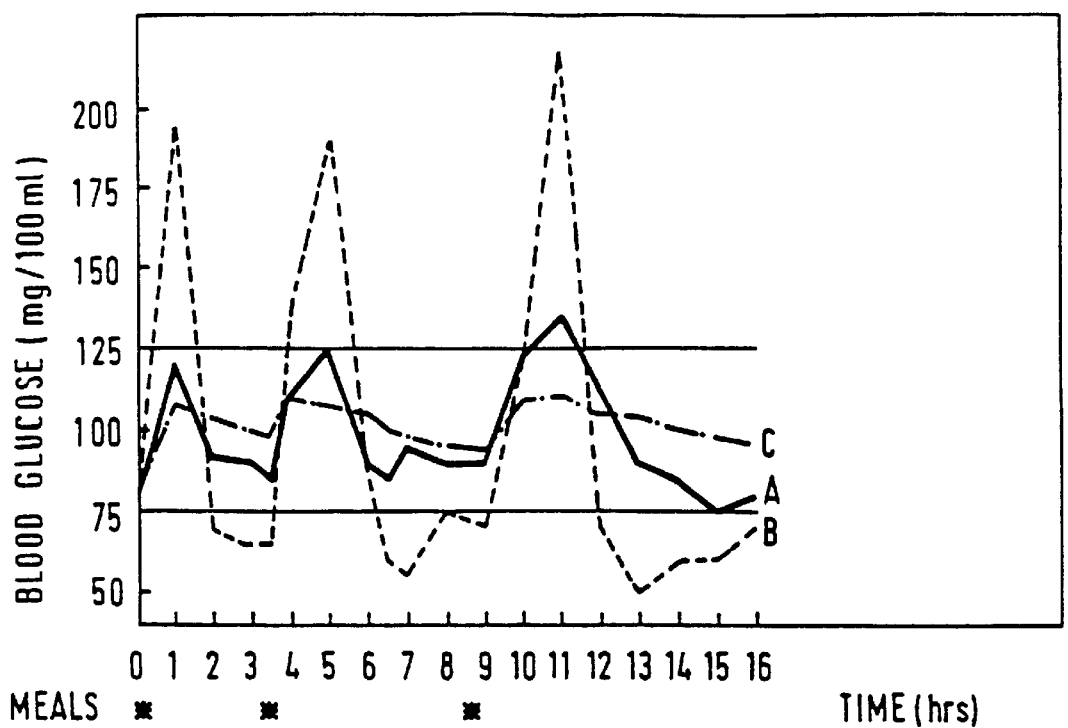
FIG. 3 is a hypothetical illustration of other varying blood glucose levels of a healthy person and a diabetic person fed uncoated foods; and a diabetic person fed coated foods in accordance with the present invention.

As is discussed herein, the invention provides the use of cation crosslinked polysaccharide coated carbohydrate-containing alimentary material as a food for an individual suffering from diabetes, hypoglycemia or glycogen storage disease. In the case of diabetes, the effect of such a use is illustrated in the graph of FIG. 3.

Therein, the line "A" represents the blood glucose level of a healthy person fed conventional (uncoated) carbohydrate-containing foods at times of 0, 3.5 and 8.5 hours. It will be seen that the blood glucose of the individual generally lies within the preferred range of 75–125 mg/100 ml. After each meal, the blood glucose rises as the carbohydrate content of the food is digested, and then subsides as insulin is released.

The line "B" represents the blood glucose level of a diabetic fed with the same foods. It will be seen that the blood glucose level is poorly controlled, and rapidly rises after each meal because the individual is not able to control this using insulin. After all of the glucose has been released from the food after the meal, the blood glucose level falls as glucose is taken out of the blood stream by natural metabolism or for excretion in urine.

The line "C" represents the blood glucose level of a diabetic fed with the same foods as used in "A" and "B" above, but which have been coated with a cation crosslinked polysaccharide. Such coated foods do not give rise to significant glucose peaks after each meal because the carbohydrate contained in the food is digested relatively slowly in the small intestine, resulting in a slower release of glucose into the bloodstream. This slow release of glucose does not require moderating with insulin, and so helps to control the blood glucose level of the diabetic.

Figure 4:
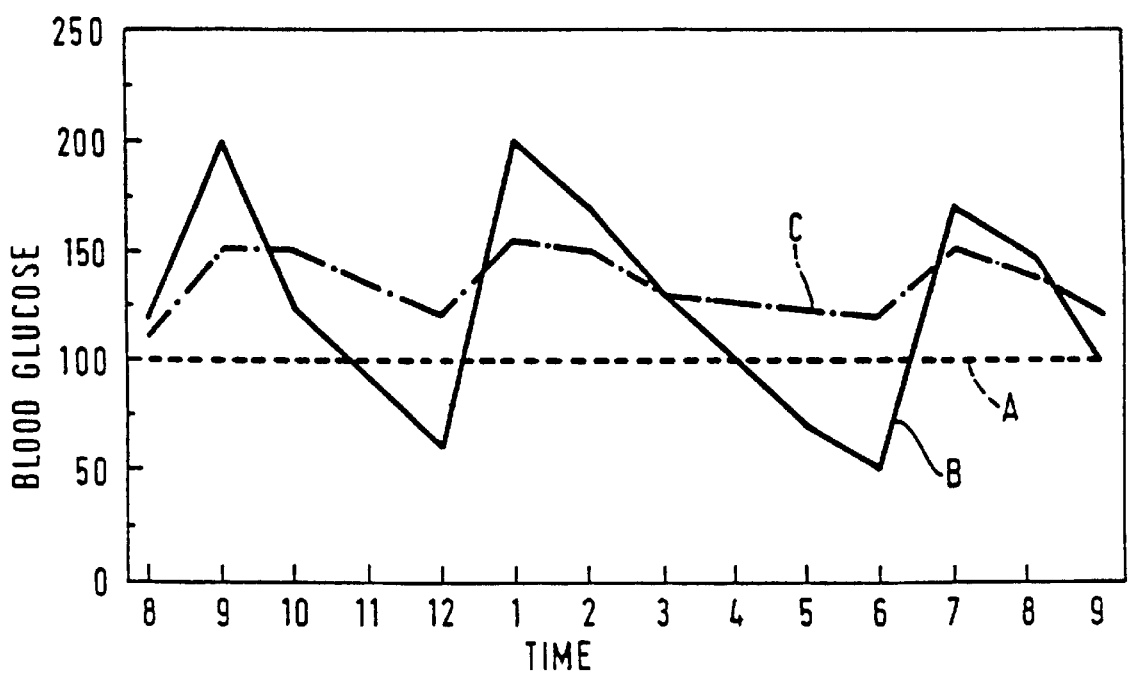
FIG. 4 is a hypothetical illustration showing the blood glucose levels of an individual suffering from hypoglycemia when fed uncoated and coated foods.

The benefits of the coated foods for individuals who suffer from hypoglycemia are illustrated in FIG. 4. Therein, line "A" represents an ideal blood glucose level of 100 mg/100 ml. Line "B" represents a hypoglycemic's blood glucose level during a day when meals are eaten at around 8 o'clock, 12 o'clock and 6 o'clock. This line demonstrates the hypoglycemic's blood glucose level both rises above and falls below the ideal range of 75–125 mg/100 ml. When it falls below the lower limit of 75 mg/100 ml, then the individual can suffer from hypoglycemic shock which can be very serious.

In contrast, the line "C" represents the individual's blood glucose level when fed with the same meals as in "B" but in which the carbohydrate-containing parts are coated with a cation crosslinked polysaccharide in accordance with the present invention. It will again be seen that such a coating causes the blood glucose level to be smoothed out because of the slower digestion of the polysaccharide-containing components of the food in the individual's small intestine.

The invention is illustrated by the following Examples. These are provided for the purpose of illustration, and are not to be construed as limiting the scope of the invention.

EXAMPLE 1

Two-step Coating of Rice Grains
(a) Coating with Crosslinkable Pectate 10 g of long grain white rice was washed and then added to an aqueous solution of 100 ml of 2% of the pectate LM1912CSZ (2 g per 100 ml of solution), obtainable from Hercules Incorporated. Pectate LM1912CSZ is a low methoxyl pectin with a degree of esterification of around 3% and a molecular weight of around 70,000–90,000 based upon its relative viscosity. The solution was boiled for around 16 minutes and the excess solution then poured away.

The resulting rice was then dried overnight at 90° C. in a dry incubator. This step produces parboiled rice grains coated with a crosslinkable pectate coating. In fact, due to the rice including some natural content of calcium cations, a relatively small amount of the pectate is already crosslinked at this intermediate stage. However, the majority of the pectate was not crosslinked, and so the coating is quite elastic at this stage.

(b) Crosslinking of the Pectate Coating 25 ml of an aqueous solution containing 1% by weight of calcium chloride was heated to 100° C. 5 g of the intermediate dried rice product produced according to the above procedure (a) was added to the solution which was then boiled for 5 minutes. During this boiling the parboiled rice grains became fully cooked, and the crosslinkable pectate coating their surface became crosslinked due to the calcium cations present in the solution. After boiling the solution for 5 minutes, excess liquid was poured away to obtain the final coated rice product ready for eating. This rice product was found to include about 1.6% by weight of the crosslinked pectate coating.

Further rice products were obtained by following the above steps (a) and (b) except that the concentration of the pectate LM1912CSZ was varied in step (a) to be 1% by weight, 3% by weight and 5% by weight. A control experiment was also carried out in which no pectate was contained in the solution used in step (a). Accordingly, five different rice products were obtained in which the starting concentration of the pectate in step (a) was 0%, 1%, 2%, 3% and 5%.

(c) In vitro Glucose-release Characteristics of the Rice Products

Each of the five rice products previously obtained was subjected to an in vitro digestion assay to establish the rate at which the products release glucose. The in vitro assay method used was as follows.

The assay makes use of the following five reagents.

Enzyme Solution I. Amyloglucosidase activity 13 AGU/ml Invertase activity 200 EU/ml Pancreatine, amylase activity 3800 BPU/ml Enzyme Solution II. Amyloglucosidase activity 50 AGU/ml Glucose oxidase calorimetric kit. Glucose GOD-PAP, Boehringer Mannheim, Cat. no. 166391.

Glucose standard solution. Dissolve 50 mg of glucose in 50 ml distilled water (1 mg/ml). Concentrations of the standards 0–0.8 mg/ml 50 $\mu$l standard solution/sample+ 1000 $\mu$l reagent mixture of the glucose oxidase colorimetric kit.

Sodium acetate buffer (0.1M). Dissolve 13.6 g of sodium acetate trihydrate in 250 ml saturated benzoic acid solution, adjust the pH to 5.2, add 4 ml of 1M $CaCl_2$ and make to 1 1 with distilled water.

For each of the five rice products, approximately 5 g of the cooked rice was weighed exactly. The rice was then dried overnight in an oven at 90° C. and weighed the next day to determine its dry matter. A further sample of each rice was masticated in a mincer with a plate having 0.9 cm diameter holes obtained from the Kitchen Basic range marketed by Boots, Nottingham, UK. Then, an exactly weighed amount of about 2.5 g of each of the five masticated rices was added to 20 ml of the sodium acetate buffer contained in five separate 50 ml Falcon tubes. Then, five glass balls were added. The tubes were pre-incubated in a shaking water bath at 37° C. for five minutes. Then digestion was initiated with 5 ml of the Enzyme Solution I. 0.5 ml samples were then taken after 5, 10, 15, 20, 30, 60, 90, 120 and 180 minutes and pipetted into 1.0 ml of 96% ethanol. This was then centrifuged for 2 minutes at 3000 rpm. 50 $\mu$l of the resting solution was then diluted with 1000 $\mu$l of distilled water. The glucose content was then measured using a glucose standard solution according to the following equation:

$$FG=[DF\times(V+A)]/Z$$

wherein FG is the free glucose expressed as mg/g dry

DF is the dilution factor (1.05/0.05×1.5/0.5)

V is the volume left in the incubation (after 5 minutes this is 25 ml, after 10 minutes this is 24.5 ml, etc.)

A is the amount (ml) of cooked rice in the incubation (e.g., 2.5 g=2.5 ml)

Z is the amount (g) of cooked rice in the incubation as measured dry.

After 180 minutes, each of the five samples contained 20.5 ml of solution and the cooked rice. The tubes were then vigorously shaken and placed in a boiling water-bath for 30 minutes. Then the tubes were cooled down to 0° C. and 10 ml of 7M KOH was added. The tubes were then placed in a shaking water-bath with ice for 30 minutes.

In advance, Falcon tubes were prepared with 50 ml of 0.1 M acetic acid. Then 1.0 ml of the alkaline solution was pipetted into the acetic acid solution followed by 0.2 ml of the Enzyme Solution II. The tubes were shaken and placed in a water-bath at 60° C. After 30 minutes, the tubes were placed in a boiling water-bath for 10 minutes followed by cooling and centrifuging for 5 minutes at 1500 g to remove the precipitate. Total glucose was then determined by pipetting 50 $\mu$l of the resulting solution into 1000 $\mu$l of the reagent mixture of the glucose oxidase colorimetric kit and the glucose measured against a standard curve. The total glucose is defined by the following equation:

$$TG=[DF\times\{(V_2+A)/(V_1+A)\}\times(V+A)]/Z$$

wherein TG is the total glucose (mg/g dry)

$V_1$ is 20.5 ml, $V_2$ is 30.5 ml, V is 25 ml

A is the amount (ml) of cooked rice in the incubation (e.g. 2.5 g=2.5 ml)

Z is the amount (g) of cooked rice in the incubation as dry.

The percentage of glucose released is defined by the equation (FG×100)/TG.

Figure 5:
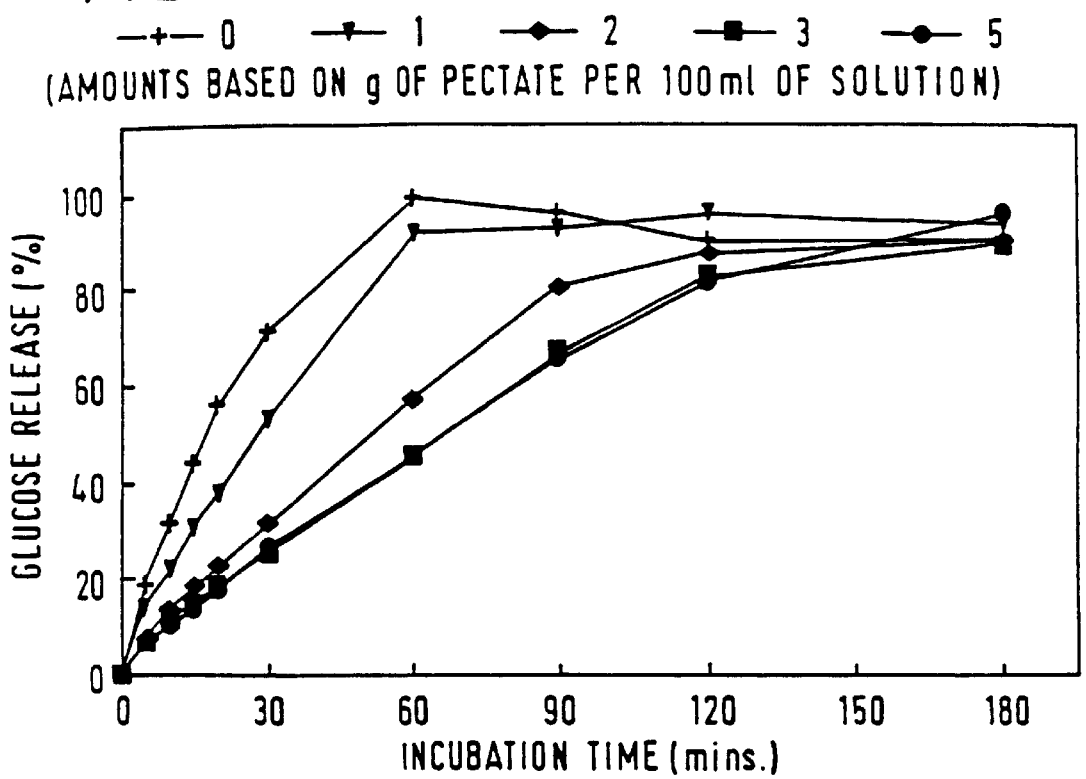
FIG. 5 is a graph which illustrates how the percentage of glucose released from a coated food varies with the amount of coating applied around the food.

The results of the various assays are illustrated in the graph forming FIG. 5. It is apparent that the greater the pectate concentration used in step (a) during coating of the rice grains, then the slower the glucose release is with time in the in vitro assay.

Thus, in the control where no pectate was used, all of the glucose was released after about 60 minutes. When a 1% solution of pectate was used, then the glucose release was marginally slower, perhaps being complete after about 90 minutes. In contrast, when the initial pectate solution contained 2% by weight of pectate or more, then 60% or less of the glucose was released after 60 minutes. Further, glucose release continued steadily for around 120–150 minutes.

Figure 6:
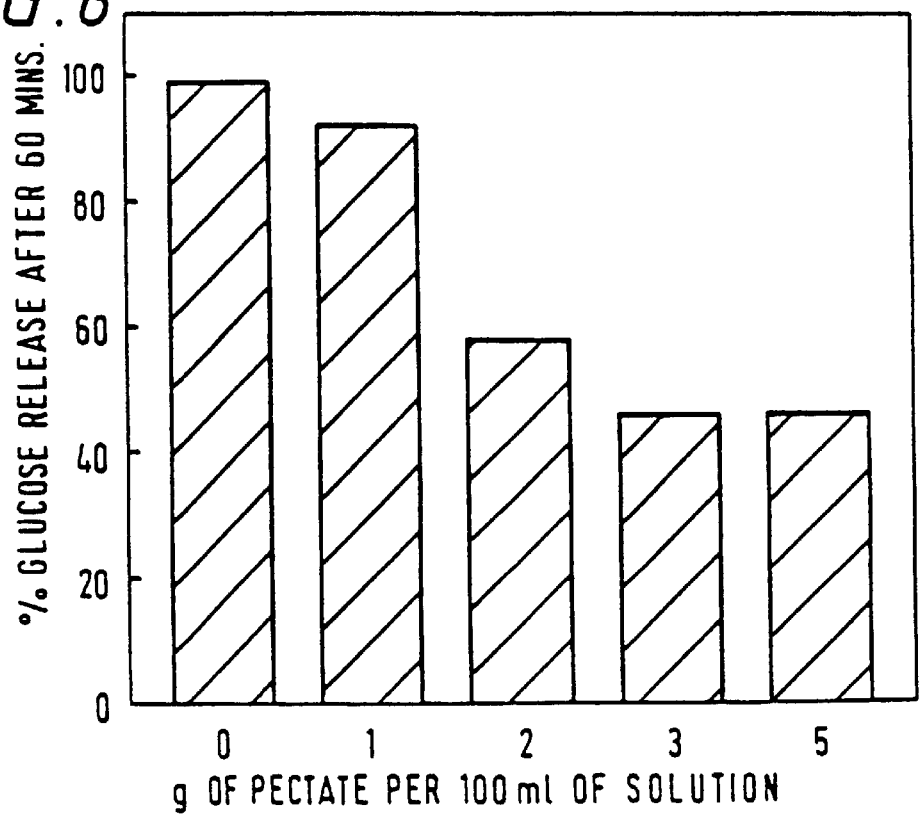
FIG. 6 is a graph which illustrates glucose release from a food coated with varying thickness of coating.

Accordingly, it can be seen that the rate of glucose release, which corresponds roughly to the initial slope of the curves illustrated in FIG. 5, decreases as the relative amount of pectate coating the rice grains increases. This effect is clearly illustrated in FIG. 6, in which the percentage of glucose released after 60 minutes for each of the rice samples is illustrated as a bar graph. The data for this graph was taken from the data illustrated in FIG. 5 after an in vitro incubation time of 60 minutes.

The following Examples 2–11 demonstrate that the coating procedure provided as one aspect of the present invention results in a product which results in a slower release rate of glucose in an in vitro digestion system. Example 11 shows that a coating of calcium stearate as described at line 38, column 2 of U.S. Pat. No. 5,360,614 is not resistant to physiological concentrations of bile acids.

Each of the Examples 2–11 measures glucose release according to the ENGLYST et al. in vitro assay method. Two hours of in vitro incubation according to the ENGLYST et al. assay method results in an extent of digestion which generally corresponds to a period of around 4–5 hours in the small intestine. Accordingly, it can be understood that the incubation conditions according to the ENGLYST et al. assay method result in accelerated glucose release from a food as compared to digestion in vivo.

EXAMPLE 2

100 g of washed long grain white rice was boiled in 227 ml of a 1% (wt/vol) sodium alginate (Sigma Chemicals) solution in distilled water for 10 minutes (all water absorbed). The rice was then dried overnight in a dry incubator at 50° C. Subsequently 20 g of the dried rice was soaked in 100 ml of a 1% (wt/vol) $CaCl_2$ solution for 1 h at room temperature. After overnight drying (55° C.), 5 g of the rice was boiled for 3 minutes in a 25 ml 1% $CaCl_2$ solution. After pouring off the excess water, the cooked rice was subjected to digestion according to the in vitro assay method of ENGLYST et al. as discussed above. For control rice the same procedure was applied except sodium alginate was not present in the first cooking step.

Glucose-Release (% of total)

| Time (minutes) | Control Rice | Ca-alginate coated rice |
| --- | --- | --- |
| 0 | 0 | 0 |
| 5 | 12 | 9 |
| 20 | 37 | 25 |
| 30 | 55 | 36 |
| 60 | 88 | 67 |
| 90 | 92 | 97 |
| 180 | 101 | 98 |

EXAMPLE 3

200 g of washed long grain white rice was boiled in 450 ml of a 2% (wt/vol) sodium alginate (Sigma Chemicals) solution in distilled water for 13 minutes (all water absorbed). The cooked rice was dried overnight in a dry incubator at 70° C. 5 gram of the dried rice was boiled in 25 ml of a 1% (wt/vol) $CaCl_2$ solution for 3 minutes. After pouring off the excess water, the cooked rice was subjected to in vitro digestion according to the method of ENGLYST et al. For control rice the same procedure was applied except for the absence of sodium alginate from the first cooking step.

Glucose-Release (% of total)

| Time (minutes) | Control Rice | Ca-alginate coated rice |
| --- | --- | --- |
| 0 | 0 | 0 |
| 5 | 8 | 4 |
| 20 | 25 | 12 |
| 30 | 37 | 17 |
| 60 | 68 | 30 |
| 90 | 88 | 46 |
| 120 | 94 | 60 |
| 180 | 90 | 89 |

EXAMPLE 4

The same procedure as in Example 3 was followed except 20 g of the dried, cooked rice was soaked for 1 hour at room temperature in a 1% (wt/vol) $CaCl_2$ solution. After overnight drying (70° C.), 5 g of the rice was boiled for 3 minutes in a 25 ml 1% $CaCl_2$ solution. The resulting cooked rice was analyzed using the same methodology as used in Example 3.

Glucose-Release (% of total)

| Time (minutes) | Control Rice | Ca-alginate coated rice |
| --- | --- | --- |
| 0 | 0 | 0 |
| 5 | 16 | 5 |
| 20 | 43 | 14 |
| 30 | 60 | 20 |
| 60 | 84 | 40 |
| 90 | 92 | 58 |
| 120 | 98 | 75 |
| 180 | 91 | 107 |

EXAMPLE 5

The procedure of Example 4 was followed except that the rice was boiled for 5 minutes in 1% $CaCl_2$ solution instead of 3 minutes as in Example 4.

Glucose-Release (% of total)

| Time (minutes) | Control Rice | Ca-alginate coated rice |
| --- | --- | --- |
| 0 | 0 | 0 |
| 5 | 16 | 7 |
| 20 | 52 | 19 |
| 30 | 68 | 28 |
| 60 | 88 | 56 |
| 90 | 98 | 78 |
| 120 | 102 | 82 |
| 180 | 98 | 89 |

EXAMPLE 6

Four different runs were conducted according to the procedure set forth below. In each run, a different polysaccharide was employed.

75 g of washed long grain rice was boiled in 168 ml of a solution of the polysaccharide in distilled water. Cooking was conducted for 20 minutes (i.e., until all water was absorbed). The cooked rice was dried overnight in a dry incubator at 70° C. 5 gram of the dried rice was boiled in 25 ml of a 1% (wt/vol) $CaCd_2$ solution for 5 minutes. After pouring off the excess water, the cooked rice was subjected to in vitro digestion according to the ENGLYST et al. method.

For control rice the same procedure was applied except that no polysaccharide was used.

The following were the polysaccharides used. Pectin X-4912 (CPF, Denmark) 1% wt/vol, sodium alginate (Sigma Chemicals) 2% wt/vol, sodium alginate (Pronova Biopolymer, Inc.) 1% wt/vol, and pectin LM1912CSZ (Hercules Incorporated) 1% wt/vol.

Glucose-Release (% of total)

| Time (minutes) | alginate (Pronova) | Control | X-4912 | LM1912CSZ | alginate (Sigma) |
|---|---|---|---|---|---|
| 0 | 0 | 0 | 0 | 0 | 0 |
| 5 | 19 | 16 | 9 | 7 | 10 |
| 20 | 47 | 42 | 22 | 18 | 25 |
| 30 | 60 | 58 | 31 | 26 | 33 |
| 60 | 82 | 84 | 59 | 51 | 63 |
| 90 | 90 | 89 | 74 | 70 | 82 |
| 120 | 92 | 89 | 88 | 84 | 85 |
| 180 | 89 | 92 | 84 | 91 | 92 |

EXAMPLE 7

10 g of washed long grain white rice was boiled in 100 ml of a pectin LM1912CSZ solution (2% wt/vol) in distilled water for 16 minutes. After pouring off the excess water, the cooked rice was dried overnight in a dry incubator at 90° C. 3 gram of the dried rice was boiled in 15 ml of a 1% (wt/vol) $CaCl_2$ solution in distilled water for 5 minutes. After pouring off the excess water, the cooked rice was subjected to in vitro digestion according to the ENGLYST et al. method, or according to this method without the presence of marbles. For control rice the same procedure was applied except that no pectin was used.

Glucose-Release (% of total)

|  | Time (minutes) | |
|---|---|---|
|  | 20 | 120 |
| −marbles/−Ca |  |  |
| Control | 56 | 108 |
| Pectin | 26 | 77 |
| +marbles/−Ca |  |  |
| Control | 81 | 118 |
| Pectin | 31 | 106 |
| −marbles/+Ca |  |  |
| Control | 55 | 107 |
| Pectin | 32 | 87 |
| +marbles/+Ca |  |  |
| Control | 78 | 116 |
| Pectin | 38 | 117 |

EXAMPLE 8

10 g of washed long grain rice was boiled in 25 ml of the pectin LM1912CSZ solution (2% wt/vol) in distilled water for 15 minutes (all water absorbed). Following this, the same procedure was applied as used in Example 7.

Glucose-Release (% of total)

|  | Time (minutes) | |
|---|---|---|
|  | 20 | 120 |
| −marbles/−Ca |  |  |
| Control | 41 | 107 |
| Pectin | 21 | 82 |
| +marbles/−Ca |  |  |
| Control | 63 | 116 |
| Pectin | 26 | 103 |
| −marbles/+Ca |  |  |
| Control | 41 | 100 |
| Pectin | 22 | 78 |
| +marbles/+Ca |  |  |
| Control | 53 | 109 |
| Pectin | 25 | 103 |

EXAMPLE 9

10 g of washed long grain white rice was boiled in 100 ml of a pectin LM1912CSZ or alginate (Pronova) solution (2% wt/vol) in distilled water for 16 minutes. After pouring off the excess water, the cooked rice was dried overnight in a dry incubator at 90° C. 3 gram of the dried rice was boiled in 15 ml of a 1% (wt/vol) $CaCl_2$ solution or in distilled water for 5 minutes. After pouring off the excess water, the cooked rice was subjected to in vitro digestion according to the ENGLYST et al. method and according to this method without the presence of marbles. For control rice the same procedure was applied except for the absence of pectin or alginate. The whole experiment was repeated three times, except for the alginate.

Glucose-Release as % of Total (±standard deviation)

| Time (minutes) | Control (−marbles) | LM1912CSZ (−marbles) | Alginate (−marbles) |
|---|---|---|---|
| 0 | 0 | 0 | 0 |
| 5 | 18(1) | 11(1) | 10 |
| 20 | 42(2) | 27(1) | 23 |
| 30 | 55(5) | 35(1) | 32 |
| 60 | 77(2) | 57(3) | 48 |
| 90 | 91(2) | 70(1) | 62 |
| 120 | 94(4) | 81(3) | 65 |
| 180 | 98(5) | 90(1) | 92 |

Glucose-Release as % of Total (±standard deviation)

| Time (minutes) | Control (+marbles) | LM1912CSZ (+marbles) | Alginate (+marbles) |
|---|---|---|---|
| 0 | 0 | 0 | 0 |
| 5 | 20(1) | 12(1) | 12 |
| 20 | 52(1) | 29(1) | 37 |
| 30 | 69(2) | 38(3) | 47 |
| 60 | 92(1) | 66(9) | 84 |
| 90 | 97(1) | 84(2) | 106 |
| 120 | 98(2) | 89(9) | 95 |
| 180 | 96(1) | 89(8) | 101 |

EXAMPLE 10

Rice was cooked according to Example 7 with the cooking step in distilled water. Half of the rice was masticated using a mincer with a plate of 0.9 cm diameter holes (Kitchen Basics range, Boots, Nottingham, Great Britain). In vitro digestion was carried out according to the ENGLYST et al. method. Coating materials used were pectin LM1912CSZ and alginate (Pronova).

Glucose-Release as % of Total Without Mastication

| Time (minutes) | Control | LM1912CSZ | Alginate |
| --- | --- | --- | --- |
| 0 | 0 | 0 | 0 |
| 5 | 16 | 11 | 10 |
| 20 | 40 | 30 | 26 |
| 30 | 52 | 36 | 35 |
| 60 | 76 | 59 | 55 |
| 90 | 88 | 69 | 69 |
| 120 | 93 | 81 | 76 |
| 180 | 93 | 87 | 91 |

Glucose-Release as % of Total With Mastication

| Time (minutes) | Control | LM1912CSZ | Alginate |
| --- | --- | --- | --- |
| 0 | 0 | 0 | 0 |
| 5 | 23 | 14 | 14 |
| 20 | 52 | 33 | 35 |
| 30 | 63 | 43 | 45 |
| 60 | 83 | 63 | 70 |
| 90 | 87 | 70 | 80 |
| 120 | 90 | 82 | 83 |
| 180 | 95 | 88 | 94 |

EXAMPLE 11

Corn starch was coated with either Ca-pectate or with Ca-stearate and digested in vitro according to the ENGLYST et al. method with or without 40 mM of bile acid (cholic acid). Coating with Ca-stearate was done as follows. 5 g corn starch was suspended in methanol. A solution containing 0.75 g $CaCl_2 \cdot 2H_2O$ in methanol was added. After stirring for a while a solution containing 1.55 g sodium stearate in methanol was added. After mixing the suspension was filtered and dried.

Glucose-Release as % of Total Without Bile Acids

| Time (minutes) | Control | Ca-pectate | Ca-stearate |
| --- | --- | --- | --- |
| 0 | 0 | 0 | 0 |
| 5 | 63 | 27 | 13 |
| 20 | 109 | 52 | 14 |
| 30 | 110 | 61 | 22 |
| 60 | 112 | 86 | 45 |
| 90 | 108 | 92 | 68 |
| 120 | 107 | 102 | 80 |
| 180 | 106 | 96 | 85 |

Glucose-Release as % of Total With Bile Acids

| Time (minutes) | Control | Ca-pectate | Ca-stearate |
| --- | --- | --- | --- |
| 0 | 0 | 0 | 0 |
| 5 | 43 | 25 | 21 |
| 20 | 67 | 48 | 43 |
| 30 | 80 | 66 | 60 |
| 60 | 108 | 83 | 97 |
| 90 | 102 | 97 | 97 |
| 120 | 99 | 95 | 108 |
| 180 | 99 | 94 | 101 |

Finally, although the invention has been described with reference to particular means, materials, and embodiments, it should be noted that the invention is not limited to the particulars disclosed, and extends to all equivalents within the scope of the claims.

The entire disclosure of application Ser. No. 08/537,399 is considered as being part of the disclosure of this application and is expressly incorporated by reference herein in its entirety.

What is claimed is:

1. A ready to eat, nonfried food comprising:
   (a) a cooked and hydrated core comprising a carbohydrate; and
   (b) a coating that is substantially insoluble in boiling water and substantially reduces the glycemic response of the core, the coating comprising a cation crosslinked polysaccharide which has been crosslinked during cooking and hydrating of the core.

2. The ready to eat, nonfried food of claim 1, wherein the glycemic response of the core is reduced by at least about 15% 30 minutes after initiation of the digestion when compared with the degree of in vitro starch digestion of the cooked and hydrated core that is not coated with the coating comprising a cation crosslinked polysaccharide.

3. The ready to eat, nonfried food of claim 1, wherein the glycemic response of the core is reduced by at least about 15% 60 minutes after initiation of the digestion when compared with the degree of in vitro starch digestion of the cooked and hydrated core that is not coated with the coating comprising a cation crosslinked polysaccharide.

4. The ready to eat, nonfried food of claim 1 wherein the coating covers at least about 50% of the surface area of the core.

5. The ready to eat, nonfried food of claim 1 wherein the coating covers at least substantially all of the surface area of the core.

6. The ready to eat, nonfried food of claim 1 wherein the polysaccharide comprises at least one member selected from the group consisting of alginates, alginic acid, pectins, pectinic acid, pectinates, pectates, polygalacturonic acid, carrageenans, crosslinkable cellulose and derivatives thereof, xanthan gum, agar, crosslinkable starch, and crosslinkable guar gum.

7. The ready to eat, nonfried food of claim 1 wherein the polysaccharide comprises at least one member selected from the group consisting of alginates, alginic acid, pectins, pectinic acid, pectinates, and pectates.

8. The ready to eat, nonfried food of claim 1 wherein the cation comprises at least one member selected from the group consisting of calcium and magnesium.

9. The ready to eat, nonfried food of claim 1 wherein the cation crosslinked polysaccharide comprises about 0.01–5% of the weight of the food, on a dry weight basis.

10. The ready to eat, nonfried food of claim 1 wherein the cation crosslinked polysaccharide comprises about 1–3% of the weight of the food, on a dry weight basis.

11. The ready to eat, nonfried food of claim 1 wherein the core comprises at least about 10% of the weight of the food, on a dry weight basis.

12. The ready to eat, nonfried food of claim 1 wherein the core comprises at least one member selected from the group consisting of rice, pasta, vegetables, and flour granules.

13. The ready to eat, nonfried food of claim 1 wherein the core comprises rice.

14. The ready to eat, nonfried food of claim 1 wherein the core has an elongate shape with a cross sectional area of no more than about 0.1 cm$^2$.

15. The ready to eat, nonfried food of claim 14 wherein the core comprises spaghetti.

16. The ready to eat, nonfried food of claim 14 wherein the core has a longest dimension of not more than about 1 cm.

17. The ready to eat, nonfried food of claim 1 wherein the carbohydrate comprises at least one member selected from the group consisting of peptidoglycans, polysaccharides, oligosaccharides, disaccharides, monosaccharides, and sugar alcohols.

18. The ready to eat, nonfried food of claim 1 wherein the carbohydrate comprises at least one member selected from the group consisting of starch, dextrin, sucrose, mannose, maltose, glucose, fructose, lactitol, xylitol, lactose, sorbitol, and mannitol.

19. A food preparation for cooking in an aqueous medium comprising a core comprising a carbohydrate coated with a coating comprising a crosslinkable polysaccharide, the food preparation being suspended in an aqueous medium at boiling temperature, the aqueous medium containing cations for crosslinking the crosslinkable polysaccharide.

20. The food preparation of claim 19 wherein the core comprises rice.

21. The food preparation of claim 19 wherein the core has an elongate shape with a cross sectional area of no more than about 0.1 cm$^2$.

22. The food preparation of claim 21 wherein the core comprises spaghetti.

23. The food preparation of claim 21 wherein the core has a longest dimension of not more than about 1 cm.

24. The food preparation of claim 19 wherein the crosslinkable polysaccharide comprises at least one member selected from the group consisting of alginates, alginic acid, pectins, pectinic acid, pectinates, pectates, polygalacturonic acid, carrageenans, crosslinkable cellulose and derivatives thereof, xanthan gum, agar, crosslinkable starch, and crosslinkable guar gum.

25. The food preparation of claim 19 wherein the polysaccharide comprises at least one member selected from the group consisting of alginates, alginic acid, pectins, pectinic acid, pectinates, and pectates.

26. The food preparation of claim 19 wherein the cations comprise at least one member selected from the group consisting of calcium cations and magnesium cations.

27. The food preparation of claim 19 wherein the crosslinkable polysaccharide comprises about 0.01–10% of the weight of the food on a dry weight basis.

28. The food preparation of claim 19 wherein the crosslinkable polysaccharide comprises about 0.1–5% of the weight of the food on a dry weight basis.

29. The food preparation of claim 19 wherein the core comprises at least about 10% of the weight of the food on a dry basis.

30. The food preparation of claim 19 wherein the core comprises at least one member selected from the group consisting of rice, pasta, vegetables and flour granules.

31. The food preparation of claim 19 wherein the carbohydrate comprises at least one member selected from the group consisting of peptidoglycans, polysaccharides, oligosaccharides, disaccharides, monosaccharides, and sugar alcohols.

32. The food preparation of claim 19 wherein the carbohydrate comprises at least one member selected from the group consisting of starch, dextrin, sucrose, mannose, maltose, glucose, fructose, lactitol, xylitol, lactose, sorbitol, and mannitol.

* * * * *